United States Patent
Sagar

(10) Patent No.: US 9,525,865 B2
(45) Date of Patent: Dec. 20, 2016

(54) FAULT DETECTION AND METHOD OF DETECTING FAULTS IN DIGITAL IMAGING SYSTEMS

(71) Applicant: Texas Instruments Incorporated, Dallas, TX (US)

(72) Inventor: Rajat Sagar, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 63 days.

(21) Appl. No.: 14/521,751

(22) Filed: Oct. 23, 2014

(65) Prior Publication Data
US 2016/0119617 A1   Apr. 28, 2016

(51) Int. Cl.
*H04N 17/00* (2006.01)
*H04N 5/232* (2006.01)
*H04N 5/238* (2006.01)

(52) U.S. Cl.
CPC ............ *H04N 17/002* (2013.01); *H04N 5/238* (2013.01); *H04N 5/23222* (2013.01)

(58) Field of Classification Search
CPC .. H04N 17/002; H04N 5/23222; H04N 5/238; H04N 5/367; H04N 5/3675; H04N 5/365; H04N 5/357
See application file for complete search history.

(56) References Cited

U.S. PATENT DOCUMENTS

| | | | |
|---|---|---|---|
| 7,286,171 B2 | 10/2007 | Kim | |
| 7,684,634 B2 * | 3/2010 | Kilgore | F41G 7/2213 382/254 |
| 8,009,209 B2 * | 8/2011 | Chapman | H04N 5/367 348/246 |
| 8,063,957 B2 * | 11/2011 | Goma | H04N 5/367 348/229.1 |
| 8,189,887 B2 | 5/2012 | Kollias et al. | |
| 8,519,348 B2 * | 8/2013 | Topfer | A61B 6/585 250/370.11 |
| 2007/0104357 A1 | 5/2007 | Worster et al. | |
| 2007/0222871 A1 * | 9/2007 | Goma | H04N 5/367 348/246 |
| 2008/0056606 A1 * | 3/2008 | Kilgore | F41G 7/2213 382/275 |
| 2008/0218610 A1 * | 9/2008 | Chapman | H04N 17/002 348/246 |
| 2009/0135414 A1 | 5/2009 | Chang et al. | |
| 2011/0057802 A1 * | 3/2011 | Topfer | A61B 6/585 340/584 |
| 2015/0170376 A1 * | 6/2015 | Bishop | G06T 5/005 382/167 |

* cited by examiner

*Primary Examiner* — Nicholas Giles
(74) *Attorney, Agent, or Firm* — Ronald O. Neerings; Frank D. Cimino

(57) ABSTRACT

A method of analyzing a digital camera includes generating first image data using an image sensor in the camera. A first analysis is performed on at least one portion of the first image data. Second image data is generated using the image sensor and a second analysis is performed on the at least one portion of the second image data. The results of the first analysis are compared to the results of the second analysis. A signal indicating a fault with the digital camera is generated in response to the first analysis differing from the second analysis by a predetermined amount.

20 Claims, 2 Drawing Sheets

FAULT DETECTION AND METHOD OF DETECTING FAULTS IN DIGITAL IMAGING SYSTEMS

BACKGROUND

Digital imaging systems, such as digital cameras, are used in many critical situations, such as automotive applications and security applications. For example, as digital imaging improves, advancements are being made in automated driver assistance systems (ADAS) wherein a driver is assisted by use of a digital camera. A fault in the digital camera used in automotive applications or other critical applications can have severe detrimental implications. For example, in automotive applications, the failure of a digital camera that is being relied upon by a driver may cause a vehicle collision.

Complete failure or partial failure of digital cameras can be instantaneous or gradual over a long period. For example, physical impacts on a digital camera can damage a lens or other components in the camera, which causes an instantaneous failure of the digital camera. The failure can be a complete failure in which the digital camera fails to operate or it can be a partial failure or degradation in which the images captured by the digital camera are degraded. Over long periods, the characteristics of pixels and other components in the digital camera can change, which slowly changes the operation of the digital camera and can eventually lead to a complete failure.

SUMMARY

A method of analyzing a digital camera includes generating first image data using an image sensor in the camera. A first analysis is performed on at least one portion of the first image data. Second image data is generated using the image sensor and a second analysis is performed on the at least one portion of the second image data. The results of the first analysis are compared to the results of the second analysis. A signal indicating a fault with the digital camera is generated in response to the first analysis differing from the second analysis by a predetermined amount.

DETAILED DESCRIPTION

Figure 1:
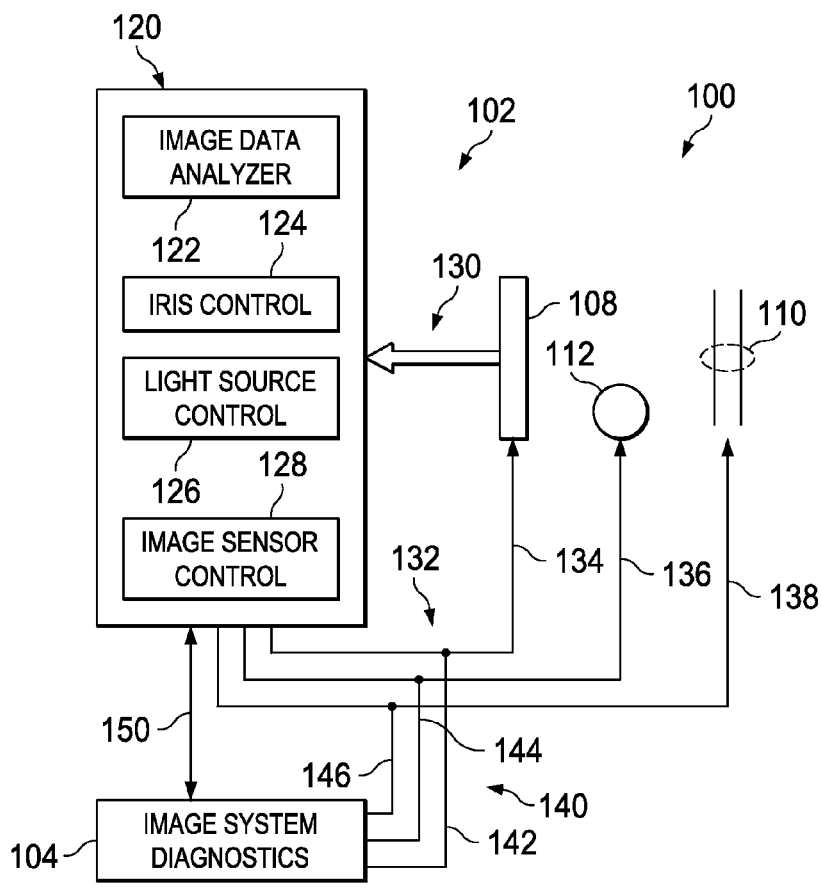
FIG. 1 is a block diagram of an embodiment of a digital camera and a diagnostic system.

Reference is made to FIG. 1, which is a block diagram of an embodiment of an imaging system 100 that includes a digital camera 102 and image system diagnostics 104, which is sometimes referred to as the diagnostics 104. The diagnostics 104 may be hardware, software, or combinations thereof that analyze image data generated by the camera 102 to determine if the camera is failing, degrading, or facing imminent failure. In some embodiments, the diagnostics 104 also controls certain functions of the camera 102 and analyzes the resulting image data. The diagnostics 104 is shown as being a separate item from the camera 102, however, in some embodiments, the camera 102 and the diagnostics 104 are integral. The camera 102 is described herein as being a digital video camera, however, in some embodiments, the camera 102 is a digital still camera.

The camera 102 includes camera components, which in the examples described herein include an image sensor 108, an iris 110, and a light source 112. The image sensor 108, iris 110, and light source 112 are controlled by a processor 120. Digital cameras typically include several other components that are not shown herein and may be included in other embodiments of the camera 102. The image sensor 108 is a conventional image sensor that converts light to electrical signals as is known in the art. Embodiments of the image sensor 108 include complementary metal oxide semiconductor (CMOS) devices and charge-coupled devices (CODs). The image sensor 108 has a plurality of pixels (not shown in FIG. 1) that each convert small portions of an image that is incident to the image sensor 108 to image data. In some embodiments, the image data includes the color of light and the intensity of light that is incident on the pixel. The image date generated by the image sensor 108 is sometimes referred to as raw image data. The raw image data is processed by a processor 120 to yield processed image data or a digital image.

The iris 110 is located proximate the image sensor 108 and controls the amount or intensity of light that is incident on the image sensor 108. In low light conditions, the iris 110 opens to allow more light to be incident on the image sensor 108 and in high light conditions, the iris 110 reduces the amount of light that is incident on the image sensor 108. If too much light is incident on the image sensor 108, pixels on the image sensor 108 become saturated and the resulting digital image is degraded. Saturated pixels have so much light incident on them that they output data representative of the maximum value of their dynamic ranges. Likewise, if the light incident on the image sensor 108 is too dull, the pixels will not be able to generate accurate image data, because they are generating image data at the low end of their dynamic ranges. Both situations yield inaccurate digital images. The dynamic range is the range of light that can be detected by the image sensor 108 and can be varied by the iris 110 and adjusting the gain and/or exposure time of the image sensor 108.

The light source 112 is sometimes referred to as a glow plug and serves as a reference light source. In some embodiments, the light source 112 has a predetermined luminescence and/or color temperature. Therefore, when the light source 112 is imaged by the image sensor 108, the image sensor 108 should generate specific image data representative of the light source 108 if the image sensor 108 is functioning correctly. For example, the intensity and/or color represented by the image data should match predetermined or stored image data if the image sensor 108 and other components associated with the image sensor 108 and camera 102 are functioning correctly.

The processor 120 controls the camera 102 and analyzes and/or processes the raw image data generated by the image sensor 108. In addition, the processor 120 receives raw image data generated by the image sensor 108 and analyzes the image data in order to determine settings for the image sensor 108 and other devices in the camera 102, including the iris 110. For example, the processor 120 may determine settings for gain and exposure time for the image sensor 108. The processor 120 also processes the image data to be in a form for display to generate a digital image. The processor 120 may output image data to the diagnostics 104. In some embodiments, the processor 120 outputs commands and data per instructions received from the diagnostics 104. For example, the diagnostics 104 transmits certain instructions to the processor 120 that set parameters in the camera 102. The diagnostics 104 then analyzes the resulting image data.

The processor 120 includes several modules described below that may be software, firmware, combinations of hardware and software, or other mediums. In some embodiments, the modules are a single module; however, they are separated herein for ease of their descriptions. An image data analyzer 122 analyzes the image data generated by the image sensor 108. The image data analyzer 122 may determine the luminescence and color of the image or a portion of the image along with other variables associated with digital imaging. An iris control 124 controls the iris 110. During analysis of the image data, the processor 120 may require more or less light, so the iris control 124 causes the iris 110 to increase or decrease the light incident on the image sensor 108. A light source control 126 controls the light source 112. In some embodiments, the light source 112 is illuminated in order for the image sensor 108 to image or generate image data representative of a known light source. In some embodiments, the light source control 126 controls the intensity, color temperature, and other parameters of the light source 112. In other embodiments, the light source 112 is controlled by the diagnostics 104.

An image sensor control 128 controls the image sensor 108. In some embodiments, the image sensor control 128 controls the exposure (sometimes referred to as integration time), gain, and other parameters associated with the generation of image data by the image sensor 108. For example, if a brighter image is required, the image sensor control 128 can increase the exposure time, which increases the duration in which light is incident on the image sensor 108 during image data generation. The image sensor control 128 may also increase the gain, which increases the values of the image data generated by the pixels.

A data line 130 transmits image data from the image sensor 108 to the processor 120. In some embodiments, instructions regarding the operation of the image sensor 108 are transmitted from the processor 120 to the image sensor 108 by way of the data line 130. A plurality of control lines 132 transfer instructions from the processor 120 to the image sensor 108, the iris 110, and the light source 112. More specifically, a control line 134 transmits instructions to the image sensor 108, a control line 136 transmits instructions to light source 112, and a control line 138 transmits instructions to the iris 110. In some embodiments, the control lines 132 transmit data, such as different operating characteristics, back to the processor 120. In some embodiments, the user or manufacturer of the camera 102 determines the data and/or instructions that are transmitted between the processor 120 and camera 102. These instructions are sometimes referred to as user-defined instructions or manufacturer-defined instructions.

The diagnostics 104 monitors the image data, components in the camera 102, and other parameters in the camera 102 to determine if the camera 102 is operating properly. The function of the diagnostics 104 with the camera 102 is based on a closed loop function that allows for constant tracking of the output(s) of the processor 120. The image data is also tracked to determine if instructions, such as gain and exposure, are being set correctly per analysis of the image data. If the feedback between the image data needing correction and the instructions sent to the camera 102 is not correct, the camera 102 may be experiencing a failure. The closed loop architecture enables several forms of diagnostics including power-on diagnostic of the image sensor 108 that tests the image sensor when the camera 102 is powered up. Problems with the dynamic range and aging artifacts on the pixels can also be tested. In addition, runtime checks can be performed to make sure that image acquisition in the image sensor 108 is working within predetermined parameters.

The diagnostics 104 is described as being a separate module from the camera 102, however, in some embodiments, the diagnostics 104 is incorporated into the processor 120 or other portion of the camera 102. A plurality of data lines 140 couple the diagnostics 104 to the control lines 132. In some embodiments, the data lines 140 monitor data and/or instructions transmitted on the control lines 132. The data lines 140 may output data, such as control signals, to the image sensor 108, the iris 110, and the light source 112. A data line 142 monitors and/or transmits data between the data line 134 and the diagnostics 104. A data line 144 monitors and/or transmits data between the data line 136 and the diagnostics 104. A data line 146 monitors and/or transmits data and/or instructions between the data line 138 and the diagnostics 104.

A data line 150 transmits data and/or instructions between the processor 120 and the diagnostics 104. For example, the diagnostics 104 may monitor the image data generated by the image sensor 108, which is transmitted to the diagnostics 104 by way of the data line 150. The diagnostics 104 may also transmit instructions to the processor 120 by way of the data line 150. For example, the diagnostics 104 may instruct the processor 120 to send specific instructions to the image sensor 108 in order to perform certain diagnostics on the camera 102. The above-described data lines and control lines are examples of some of the communications in the image system 100. Other data and control line configurations may be used in other embodiments, some of which are described further below.

In the embodiment of FIG. 1, the diagnostics 104 monitors data and/or instructions transmitted on the data lines 132 to determine if the camera 102 is functioning properly. In some embodiments, and as described in greater detail below, the diagnostics 104 compares image data generated at different times to determine if the camera 102 has degraded over time or has sustained a failure. The diagnostics 104 may also operate the image sensor 108, the iris 110, and the light source 112 by transmitting instructions on the data lines 132. For example, the diagnostics 104 may instruct the processor 120 to stop sending instructions. The diagnostics 104 may then send instructions to the image sensor 108, the iris 110, and/or the light source 112 by way of the data lines 142, 144, 146 and monitors the image data generated in response to the instructions. By monitoring the resulting image data, the diagnostics 104 can determine if the camera 102 is operating properly.

Having described some of the components of the image system 100, its operation will now be described. When the imaging system 100 is in use, the processor 120 receives a signal to generate image data. In some embodiments, the imaging system 100 is affixed to a vehicle wherein electronics within the vehicle instruct the processor 120 to generate image data. The processor 120 sends instructions to the image sensor 108 to generate image data and transmit the raw image data back to the processor 120. In some embodiments, sensors, such as light sensors and the like, coupled to the processor 120 monitor the ambient conditions and provide information about the environment of the camera 102. Based on the ambient conditions, the processor 120, by way of the image sensor control 128 and the iris control 124, sends instructions to the image sensor 108 and the iris 110 to function based on the ambient conditions. In low light conditions, the image sensor control 128 may instruct the gain and/or exposure time on the image sensor 108 to be increased and the iris 110 to dilate. Likewise, in high light conditions, the image sensor control may instruct the gain and/or exposure time on the image sensor 108 to be decreased and the iris 110 to restrict.

Over time, the camera 102 will typically change or degrade, resulting in changed or degraded image data and images. For example, lenses (not shown) may become pitted or be subjected to other changes in their optical characteristics. In addition to the lenses, the gain or dynamic range of the image sensor 108 may change over time. Other changes that may occur over time include pixels within the image sensor 108 failing to where they generate image data representative of a dark spot or a bright spot, such as a saturated pixel, irrespective of the light that is incident on the pixel.

The diagnostics 104 performs many different analysis of the camera 102, which are described in detail below. The analysis involves generating and analyzing first image data, then, at a later time, generating and analyzing second image data to determine if the camera 102 has degraded and the extent of the degradation. If the degradation is greater than a predetermined amount, an alert signal may be generated indicating that the camera 102 needs to be repaired or replaced. In some embodiments, the diagnostics 104 may change the processing parameters of the image data to offset the effects of the degraded camera 102. The diagnostics 104 performs the analysis while the camera 102 is generating image data for a user and/or when it is not generating image data for a user. Some of the analyses are performed fast enough so as not to interfere with the image generated by the image data, so the analysis can be performed during normal camera operations.

In some embodiments, the diagnostics 104 analyzes image data from many frames or portions of frames, wherein a frame is image data generated by all the pixels in the image sensor 108. In such embodiments, the diagnostics 104 can analyze image data of the frame or portions of the image data to determine if the camera 102 is degrading or failing. The analysis may include averaging the image data to determine if the average value of the image data is degrading or changing beyond a predetermined amount over time. In this analysis first image data is averaged. The first image data may be image data of a frame, a plurality of frames, or portions thereof. Using image data from several frames lessens the impact of artifacts or other one-time anomalies that would otherwise cause errors in a single frame. Second image data of a frame, a plurality of frames, or portions thereof is averaged. The average of the second image data is compared to the average of the first image data to determine if degradation or failure is occurring. The image data from the plurality of frames can be analyzed to determine if the rate of change or degradation is within specified levels and to estimate a future time for replacing or repairing the camera. In similar conditions, the average of the first image data should be within a predetermined value of the second image data. In addition, the average between the first image data and the second image data in a video camera should change unless the camera is failing, such as in a locked situation where no new image data is able to be generated.

In some analyses, the diagnostics 104 analyzes and stores image data based on predetermined conditions of the camera 102. For example at some time, such as shortly after manufacture or some other time, first image data is generated. The first image data is then compared to second image data captured at a later date or time. In some embodiments, the first and second image data are captured with the iris 110 completely closed so that the image data generated by the image sensor 108 should be representative of a dark image.

The diagnostics 104 or the processor 120 can send instructions to the iris 110 causing it to close. There will typically be some pixels that generate image data indicating that there is light incident to the image sensor 108. If the number of such pixels increases rapidly or reaches a predetermined number, the diagnostics 104 can cause an alert signal to be generated indicating that the camera 102 is failing. This test may be performed during a power on sequence of the camera 102 or during a brief pause during the normal operation of the camera 102.

In another analyses, the iris 110 is closed and the light source 112 is illuminated when the image sensor 108 generates the first image data. The result is that the image sensor 108 generates image data representative of an image of a known light source having a known luminescence, color tone, and/or other parameters. Second image data is generated with the light source 112 illuminated and the iris 110 closed. The first and second image data are compared to determine if the camera 102 has degraded between the time the first image data was generated and the time the second image data was generated. If the difference between the first image data and the second image data is greater than a predetermined amount, the alert signal is generated indicating that the camera 102 may be failing. This analysis may be performed when the camera 102 powers up or during a brief pause in the operation of the camera 102.

Saturation occurs when a pixel detects an intensity of light that causes the pixel to output the maximum value of image data possible. Saturation also occurs in some situations when a pixel is defective. Regardless of the amount of light incident on the defective pixel, the defective pixel always outputs the maximum digital number. One of the analyses that may be performed by the diagnostics 104 analyzes a frame captured by the image sensor 108 and calculates the average number of saturated and unsaturated pixels in the frame. During operation of the camera 102, the average number of saturated pixels should remain constant. More specifically, the saturated pixels should be due to defective pixels and not due to excessive light incident on the image sensor 108. If a very large number of pixels are in saturation, then the gain or the exposure time of the image sensor 108 may be too high and can be lowered, such as by instructions transmitted to the processor 120 from the diagnostics 104. If the number of pixels in saturation lowers, then the pixels are not defective. If the gain and/or exposure time are lowered and the number of pixels in saturation remains high, then the image sensor 108 is likely defective or degrading and the diagnostics 104 may generate the alert signal. If there is a high number of pixels in saturation and the diagnostics 104 does not detect that the processor 120 is correcting the problem by reducing the exposure time or gain, then the diagnostics 104 may determine that the processor 120 is failing. In some embodiments, the diagnostics 104 instructs the processor 120 to ignore image data generated by the defective pixels and/or generates a signal indicating that the camera 102 is defective or degrading.

In some embodiments, the diagnostics 104 monitors the control line 134 that sends instructions to the image sensor 108 to determine if the processor 120 is controlling the gain and/or exposure time as described above. In the embodiments wherein the camera 102 includes the iris 110, the diagnostics may also monitor the control line 138 to determine whether the processor 120 is transmitting instructions to control the amount of light that is incident on the image sensor 108. If the processor is not transmitting instructions to lower the light between the first and second image data, the diagnostics 104 may determine that the processor 120 is failing and generate a signal. If the processor 120 is transmitting the correct control signals by way of the control lines 132, but the average number of saturated pixels remains high or if the image data indicates a very bright image, the diagnostics 104 generates the alert because the image sensor 108 and/or the iris 110 is likely failing. The same analysis can be applied to pixels that output digital numbers of their lowest values or close to their lowest values. These analyses may be performed during normal operation of the camera 102.

Some analyses of the camera 102 include calculating the global average of the pixel values from one frame to another. In some embodiments, a portion of the pixels in a frame are averaged instead of all the pixels. The average of first image data is then compared to the average of second image data. The image data representing the frames is generated at any time and may be analyzed while the camera 102 is in use. The global average provides a general status of the overall luminescence and/or other imaging characteristics. The overall luminescence is increased when exposure and gain are increased in the image sensor 108 and vice versa. In some analysis, the diagnostics 104 ramps the exposure up and down while keeping the gain constant and checks whether the image data follows what is configured into the image sensor 108. If first and second image data are not correct or have not changed appropriately, the alert may be generated. These tests may be performed while the camera is functioning or during a start up sequence.

The image data of a video image will never be constant other than a full black or full saturation, which indicates a defective camera 102. Using the above-described analysis based on averages, it follows that the average pixel values from first image data to second image data will change. The global average of all pixel values from first image data to second image data will also change. Based on the forgoing, the diagnostics 104 can measure the averages in first image data and compare them to the averages in second image data. If there is no change, the diagnostics 104 may generate the alert signal. These analyses may also measure the number of pixels having values greater or lower than predetermined values or the analyses can use other statistical analysis between the first and second image data.

Different embodiments of the above-described analysis can be performed by the diagnostics 104. In some embodiments, in low light conditions, where the maximum exposure is already configured, the diagnostics 104 can increase the gain of the image sensor 108 or cause the gain to be increased, to artificially amplify the pixel values between first and second image data. The light source 112 can be illuminated in very low light conditions to check the dynamic range of the pixels. The iris 110 also may be used to check the dynamic range of the image sensor 108 in very bright conditions. If the results are not within specified values, the alert signal may be generated.

Figure 2:
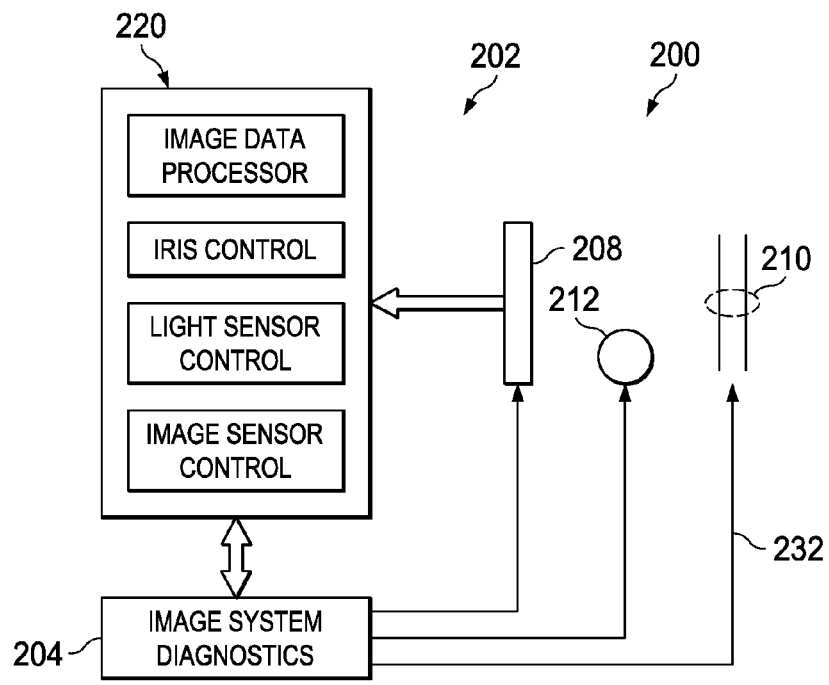
FIG. 2 is a block diagram of another embodiment of a digital camera and a diagnostic system.

Another embodiment of an imaging system 200 is shown in FIG. 2. The imaging system 200 is similar to the imaging system 100 except that the diagnostics 204 are located in-line with the control lines 232 to more directly monitor and change signals transmitted to the image sensor 208, the iris 210, and the light source 212. This configuration enables the diagnostics 204 to change values and instructions transmitted to the image sensor 208, the iris 210, and the light source 212 without sending instructions to the processor 220. In some embodiments, the diagnostics 204 can pass the instructions intended for the image sensor 208, the iris 210, and the light source 212 without changing them, but rather, just monitoring the instructions. For example, the diagnostics 204 can pass data and/or instructions to or from the processor 220 in order to test that the processor is transmitting the correct instructions between first and second image data. In other embodiments, the diagnostics 204 can interrupt the data flow to transmit its own data and/or instructions to make sure the image data changes accordingly between first image data and second image data.

In the embodiment of FIG. 2, the diagnostics 204 can operate the image sensor 208, the iris 210, and the light source 212 independent of the processor 220. For example, the diagnostics 204 may terminate instructions from the processor 220 and transmit its own instructions. The diagnostics 204 may then monitor instructions transmitted from the processor 220 to determine whether the processor is transmitting correct instructions in response to the instructions transmitted by the diagnostics 204.

Figure 3:
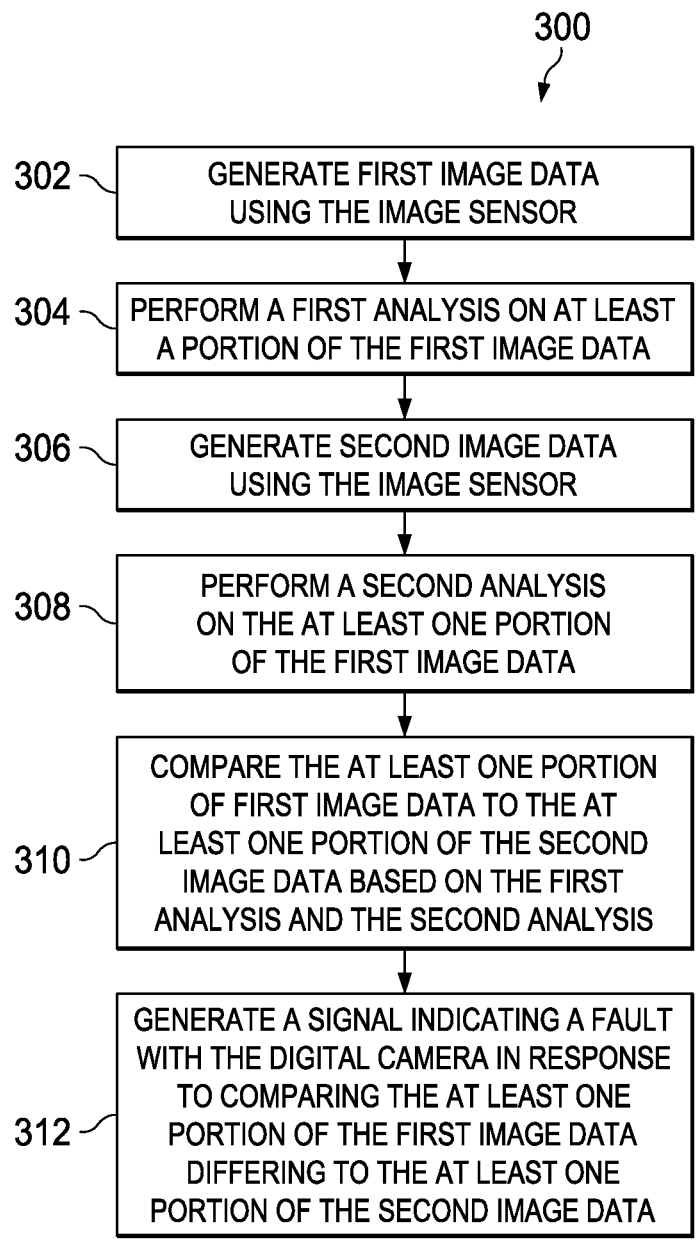
FIG. 3 is a flow chart illustrating an embodiment of the operation of the digital camera and diagnostic system.

The operation of both imaging systems 100 and 200 are described by the flowchart 300 of FIG. 3 as follows. The operation starts with generating first image data using the image sensor 108, 208 as shown in step 302. At step 304, a first analysis is performed on at least a portion of the first image data. At step 306 second image data is generated using the image sensor. At step 308, a second analysis is performed on the at least one portion of the second image data. The process continues with comparing the at least one portion of first image data to the at least one portion of the second image data based on the first analysis and the second analysis as shown in step 310. At step 312 a signal indicating a fault with the digital camera is generated in response to the at least one portion of the first image data differing from the at least one portion of the second image data by a predetermined amount.

The feedback loop of the imaging system 100, 200 may perform the above-described analyses in addition to the analyses described below. As described above, the dynamic range of the pixels is tested. Low light and known light conditions are set in the camera 102, 202, which is also used to test the gain of the image sensor 108, 208 and the pixels. Color sensitivity may be tested by illuminating the image sensor 108, 208 with the light source 112, 212 and generating first and second image data. If the colors represented by the light source changes greater than a predetermined amount between the first and second image data, then the color sensitivity of the image sensor 108, 208 is likely degrading. The tests described above have related to detecting or counting defective or degraded pixels. In some embodiments, clusters of defective or degraded pixels are located. If large clusters or large numbers of clusters are detected, the diagnostics 104, 204 may determine that the image sensor 108, 208 is defective or failing.

While illustrative and presently preferred embodiments of integrated circuits have been described in detail herein, it is to be understood that the inventive concepts may be otherwise variously embodied and employed and that the appended claims are intended to be construed to include such variations except insofar as limited by the prior art.

What is claimed is:

1. A method of analyzing a digital camera, the digital camera comprising an image sensor having a plurality of pixels that generate image data, the method comprising:
   generating first image data using the image sensor;
   performing a first analysis on at least one portion of the first image data;
   generating second image data using the image sensor;
   performing a second analysis on the at least one portion of the second image data;

comparing results of the first analysis to results of the second analysis;
generating a first signal indicating a first fault with the digital camera in response to the first analysis differing from the second analysis by a predetermined amount;
monitoring control data transmitted to the image sensor; and
generating a second signal indicating a second fault with the digital camera in response to the data transmitted to the image sensor not corresponding to data to correct at least one error between an image represented by the first image data and an image represented by the second image data.

2. The method of claim 1 wherein:
the at least one portion of the first image data corresponds to intensity of light incident to at least one pixel located on the image sensor;
performing a first analysis comprises analyzing the first image data corresponding to the intensity of light on the at least one pixel;
performing a second analysis comprises analyzing the second image data corresponding to the intensity of light on the at least one pixel;
generating a first signal comprises generating a signal indicating a fault in response to the result of the first analysis being substantially the same as the result of the second analysis.

3. The method of claim 1, wherein:
the at least one portion of the first image data corresponds to intensity of light incident to at least one pixel located on the image sensor;
the at least one portion of the second image data corresponds to intensity of light incident to the at least one pixel located on the image sensor;
the first image data and the second image data have maximum values;
performing a first analysis comprises determining if the at least one portion of the first image data is substantially the maximum value;
performing a second analysis comprises determining if the at least one portion of the second image data is substantially the maximum value; and
wherein the generating a first signal comprises generating a signal indicating a fault in response to the at least one portion of the first image data being substantially at the maximum value and the at least one portion of the second image data being substantially at the maximum value.

4. The method of claim 1, wherein:
the at least one portion of the first image data corresponds to intensity of light incident to at least one pixel located on the image sensor;
the at least one portion of the second image data corresponds to intensity of light incident to the at least one pixel located on the image sensor;
the first image data and the second image data have minimum values;
performing a first analysis comprises determining if the at least one portion of the first image data is substantially the minimum value;
performing a second analysis comprises determining if the at least one portion of the second image data is substantially the minimum value; and
wherein the generating a first signal comprises generating a signal indicating a fault in response to the at least one portion of the first image data being substantially at the minimum value and the at least one portion of the second image data being substantially at the minimum value.

5. The method of claim 1, wherein the camera further comprises a light source; wherein light emitted by the light source is incident to the image sensor; wherein generating the first image data comprises generating the first image data with the light source illuminated; and wherein generating the second image data comprises generating the second image data with the light source illuminated.

6. The method of claim 5, wherein the first image data and the second image data represent color of the light source.

7. The method of claim 5, wherein the camera further comprises an iris for controlling amount of external light that is incident on the image sensor, and wherein generating the first and second image data further comprises closing the iris.

8. The method of claim 1, wherein the camera further comprises an iris for controlling amount of external light that is incident on the image sensor, and wherein generating the first and second image data further comprises closing the iris.

9. The method of claim 1, wherein:
performing a first analysis comprises calculating an average pixel value from the first image data;
performing a second analysis comprises calculating an average pixel value from the second image data; and
generating a first signal indicating a first fault comprises generating a signal indicating a fault with the digital camera in response to the average pixel value from the first image data being within a predetermined amount of the average pixel value from the second image data.

10. The method of claim 1, wherein:
performing a first analysis comprises calculating an average pixel value from the first image data;
performing a second analysis comprises calculating an average pixel value from the second image data; and
generating a first signal indicating a fault comprises generating a signal indicating a fault with the digital camera in response to difference of the average pixel value from the first image data and the average pixel value from the second image data being greater than a predetermined amount.

11. The method of claim 1, wherein:
performing a first analysis comprises calculating a first dynamic range of the image sensor;
performing a second analysis comprises calculating a second dynamic range of the image sensor; and
generating a first signal indicating a fault comprises generating a signal indicating a fault with the digital camera in response to difference between the first dynamic range and the second dynamic range being greater than a predetermined amount.

12. The method of claim 1, wherein the first image data is generated substantially near a time of manufacture of the camera.

13. The method of claim 1, wherein
the first image data is image data of a first plurality of image frames, and
the second image data is image data of a second plurality of image frames.

14. The method of claim 1, wherein the control data is one or more of
a gain of the image sensor, and
an exposure time of the image sensor.

15. A method of analyzing a digital camera, the digital camera comprising an image sensor having a plurality of pixels that generate image data, the method comprising:
    generating first image data from a first plurality of image frames using the image sensor;
    performing a first analysis on at least one portion of the first image data;
    generating second image data from a second plurality of image frames using the image sensor;
    performing a second analysis on the at least one portion of the second image data;
    comparing results of the first analysis to results of the second analysis;
    determining a rate of change of image data between the first analysis and the second analysis; and
    generating a signal indicating a fault with the digital camera in response to the first analysis differing from the second analysis by a predetermined amount.

16. The method of claim 15, wherein the generating a signal comprises generating a signal indicating a timeframe for replacing the digital camera.

17. An apparatus comprising:
    an image sensor having a plurality of pixels, the image sensor is configured to generate a first image data and a second image data;
    a processor coupled to the image sensor and configured to transmit control data to the image sensor; and
    a diagnostic module coupled to the processor and configured to
       perform a first analysis on at least one portion of the first image data,
       perform a second analysis on the at least one portion of the second image data;
       compare results of the first analysis to results of the second analysis,
       generate a first signal indicating a first fault with the apparatus in response to the first analysis differing from the second analysis by a predetermined amount,
       monitor control data transmitted to the image sensor, and
       generate a second signal indicating a second fault with the apparatus in response to the data transmitted to the image sensor not corresponding to data to correct at least one error between an image represented by the first image data and an image represented by the second image data.

18. The apparatus of claim 17 wherein:
    the first signal comprises one or more of
       a signal indicating a fault in response to the result of the first analysis being substantially the same as the result of the second analysis,
       a signal indicating a fault in response to the at least one portion of the first image data being substantially at the maximum value and the at least one portion of the second image data being substantially at the maximum value,
       a signal indicating a fault in response to the at least one portion of the first image data being substantially at the minimum value and the at least one portion of the second image data being substantially at the minimum value,
       a signal indicating a fault with the apparatus in response to average pixel value from the first image data being within a predetermined amount of average pixel value from the second image data,
       a signal indicating a fault with the apparatus in response to difference of the average pixel value from the first image data and the average pixel value from the second image data being greater than a predetermined amount, and
       a signal indicating a fault with the apparatus in response to difference between a first dynamic range of the image sensor and a second dynamic range of the image sensor being greater than a predetermined amount.

19. The apparatus of claim 17, wherein the apparatus is a digital camera and further comprising:
    a light source, wherein light emitted by the light source is incident to the image sensor, wherein
       the first image data comprises image data with the light source illuminated, and
       the second image data comprises image data with the light source illuminated.

20. The apparatus of claim 19, wherein the digital camera further comprises
    an iris for controlling amount of external light that is incident on the image sensor, wherein generating the first and second image data further comprises closing the iris.

* * * * *